United States Patent [19]

Barnes et al.

[11] Patent Number: 5,103,448

[45] Date of Patent: Apr. 7, 1992

[54] SIMULTANEOUS RINGING CONTROL IN THE TIME DIVISION DUPLEX TELECOMMUNICATIONS SYSTEM

[75] Inventors: Nigel E. Barnes, Surrey; Philip J. Knight, Leicestershire, both of England

[73] Assignee: GEC Plessey Telecommunications Ltd., Coventry, England

[21] Appl. No.: 494,103

[22] Filed: Mar. 14, 1990

[30] Foreign Application Priority Data

Mar. 31, 1989 [GB] United Kingdom ............... 8907317

[51] Int. Cl.$^5$ .......................... H04M 1/72; H04Q 7/04
[52] U.S. Cl. ...................................... 370/29; 370/95.2; 379/61
[58] Field of Search ............... 370/24, 26, 29, 95.1, 370/95.2, 95.3, 100.1, 110.1; 379/57, 58, 61, 62, 63, 92, 93, 94; 340/825.06, 825.07, 825.08, 825.44; 455/31, 32, 33, 34, 53, 54, 56

[56] References Cited

U.S. PATENT DOCUMENTS

| | | | |
|---|---|---|---|
| 4,802,200 | 1/1989 | Murata et al. | 379/61 |
| 4,817,089 | 3/1989 | Paneth et al. | 370/95.2 |
| 4,875,231 | 10/1989 | Hara et al. | 379/63 |
| 4,940,974 | 7/1990 | Sojka | 370/95.2 |
| 4,962,524 | 10/1990 | Murata et al. | 379/61 |
| 4,991,198 | 2/1991 | Tate et al. | 379/61 |

FOREIGN PATENT DOCUMENTS

| | | |
|---|---|---|
| 0074940 | 7/1982 | European Pat. Off. . |
| 0294233 | 3/1988 | European Pat. Off. . |
| 2193064 | 7/1987 | United Kingdom . |

*Primary Examiner*—Douglas W. Olms
*Assistant Examiner*—Alpus H. Hsu
*Attorney, Agent, or Firm*—Fleit, Jacobson, Cohn, Price, Holman & Stern

[57] ABSTRACT

A telecommunications sytem comprises a plurality of distributed base stations each operatively coupled to a public switched telecommunications network and being adapted to cooperate with one or more of a plurality of portable cordless telephone units by way of a plurality of cordless digital communication channels operating on a time division duplex basis. The base unit is arranged upon detection of an incoming public switched network call, to poll all the portable cordless telephone units by transmitting on a repetitious basis the identity of the portable units to be connected to the incoming call on a selected channel and the base unit is arranged to intersperse each poll operation with a signalling message. Each portable unit is arranged to scan the cordless channels at a predetermined interval and the base unit is adapted to postpone the sending of a ringing message to any of the portable units until a predetermined period has elapsed since the commencement of the polling action, the predetermined period being substantially similar to but larger than the predetermined interval.

4 Claims, 6 Drawing Sheets

SIMULTANEOUS RINGING CONTROL IN THE TIME DIVISION DUPLEX TELECOMMUNICATIONS SYSTEM

FIELD OF THE INVENTION

The present invention relates to communications systems particularly, but not exclusively, mobile communications systems which are relatively inexpensive to implement.

BACKGROUND OF THE INVENTION

UK. Patent 2,046,556B describes a communication system involving portable cordless telephone units which co-operate with base units which are terminations on the public switched telephone networks (PSTN) to provide public call-office type facilities for the portable cordless telephone units.

In such systems the portable cordless telephone units are self powered and to conserve power they have a cycle of 1.4 seconds, during which time they mostly try to "sleep", using as little power as possible. At least once every 1.4 s, portable units will wake-up and scan the channels to see if any base unit is trying to contact them. If they detect a base unit contacting them, they then stay awake and start interpreting the signalling being sent to them.

The base unit is responsible for polling the portable units it wants to ring when a new incoming call is detected by the base unit. In between each poll to a portable unit, the base unit sends a small signalling packet, which contains information to polled portable units, telling them whether or not to ring. Typically, a base will tell the portable unit to ring when it is detecting incoming ringing, and tell them to keep quiet while the quiet period between ringing bursts occurs.

Because portable units will be sleeping most of the time, and wake up in their own time (they are not synchronised), it is not predictable when a handset detects its own poll and starts ringing. The effect of this is that a population of handsets will appear to start ringing at random intervals, when they wake-up.

The random ringing of the portable units from a base unit is considered as undesirable particularly in multiple portable unit group ringing circumstances.

SUMMARY OF THE INVENTION

Accordingly it is one of the objects of the invention to synchronise the ringing of all of the portable units being concurrently polled from the base unit.

According to the invention there is provided a telecommunications system comprising a plurality of distributed base stations each operatively coupled to a public switched telecommunications network each base station being adapted to cooperate with one or more of a plurality of portable cordless telephone units by way of a plurality of cordless digital communication channels operating on a time division duplex basis characterized in that the base unit is arranged upon detection of an incoming public switched network call, to poll all the portable cordless telephone units by transmitting on a repetitious basis the identity of the portable units to be connected to the incoming call on a selected channel and the base unit is arranged to intersperse each poll operation with a signalling message, and each portable unit is arranged to scan the cordless channels at a predetermined interval and the base unit is adapted to postpone the sending of a ringing message to any of the portable units until a predetermined period has elapsed since the commencement of the polling action, the predetermined period being substantially similar to but larger than the predetermined interval.

During the early part of an incoming call, the base polls handsets as normal, but instead of following the detected ringing, it simply tells handsets not to ring; thus the handsets have been contacted but none of them are ringing, so no user is aware of the incoming call. After a certain interval (it's a little more than 1.4 seconds, closer to 1.8), when the base is sure that those handsets that are in range have had time to be contacted, the base then instructs the handsets to ring, using the signalling message interleaved between each poll. Every handset that has been contacted picks up the signalling (SIG) message and starts ringing simultaneously.

The above can be refined by saying that if the entire population of handsets has been contacted within the 1.8 or so seconds, the base can instruct handsets to start ringing somewhat sooner. Bases are compelled to keep track of which handsets have responded anyway, so this refinement would not be too difficult to achieve.

SIG messages are also used to tell handsets to switch ringing off, as well as telling handsets to switch ringing on, so what actually happens is that the base polls handsets in the normal way, sending interleaved SIG messages as normal, but these SIG messages tell the handsets to remain silent. Once the base is sure enough time has elapsed for most of the handsets to have been polled, it then changes the interleaved SIG messages instructing the handsets to ring.

BRIEF DESCRIPTION OF THE DRAWINGS

The invention will be more readily understood from the following description of one explanatory embodiment thereof. The embodiment of the invention should be read in conjunction with the accompanying drawings.

DETAILED DESCRIPTION OF THE PREFERRED EMBODIMENT

Figure 1:
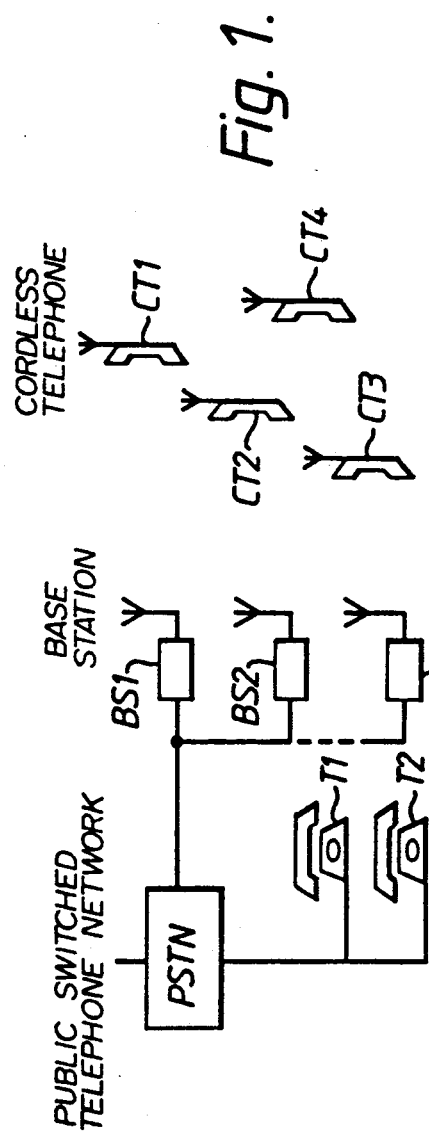
FIG. 1 shows a diagrammatic view of the communications system.

FIG. 1 shows a mobile communications system comprising a number of cordless telephones or fixed stations BS1, BS2 . . . BSN connected to the public switched telephone network PSTN. Each base station BS1 to BSN comprises a transmitter/receiver encoder/decoder unit arranged to co-operate with a number of cordless telephones CT1 to CT4 on a digital time division duplex mode basis.

Each cordless telephone CT1 and CT4 comprises a low power transmitter/receiver, encoder/decoder capable of operating on a selected one of a number of channels, to communicate on a digital time division duplex basis with any one of the base stations BS1 to BSN.

The base stations BS1 to BSN are distributed geographically throughout the area served by the public switched telephone network PSTN, and are connected to that network in a similar manner to fixed subscribers telephone instruments T1 and T2. The base stations BS1 to BSN are not dedicated on a one to one basis with the cordless telephones CT1 to CT4, and each base station has a unique identity on the PSTN. Each cordless telephone CT1 to CT4 is capable of operating with any of the base stations and each cordless telephone is given a unique identity. Typically the identity may be a two part identity defining a group of cordless telephones and having a unique identity within the group. Each base station is arranged to carry a list of cordless telephones which it has ascertained are in close proximity to that base station.

As a result of such an arrangement telephone calls may be set up from any cordless telephone, by way of any physically close base station to any other connection on the PSTN and vice versa. The cordless telephone may initiate a call using its identity or it may be called or polled from a base station as a result of a call from the PSTN being routed to the base station identified as the closest to the current location of the required cordless telephone.

Before considering the operation of the base station and the cordless telephone in the execution of an incoming call set up to a cordless telephone, some consideration of the method of signalling and data transfer between the base units and the cordless telephones is required.

The base unit and cordless telephone exchange data in a Time-Division Duplex mode with an instantaneous data rate of 72.0 Kbit/s. Under various situations up to three sub-channels have to be multiplexed within the available data bandwidth. These are:
 i) A signalling channel (D channel)
 ii) A voice/data channel (B channel)
 iii) A burst synchronization channel (SYN channel) used for bit and burst synchronization.

Figure 2:
FIG. 2 shows the multiplex used to carry data and signalling channels during a call.
Figure 3:
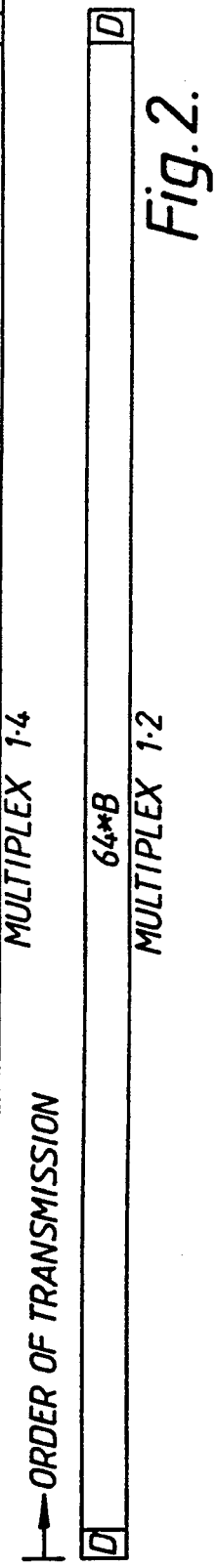
FIG. 3 shows the multiplex used to carry signalling and synchronization channels for link establishment from the base station to the portable units.
Figure 4:
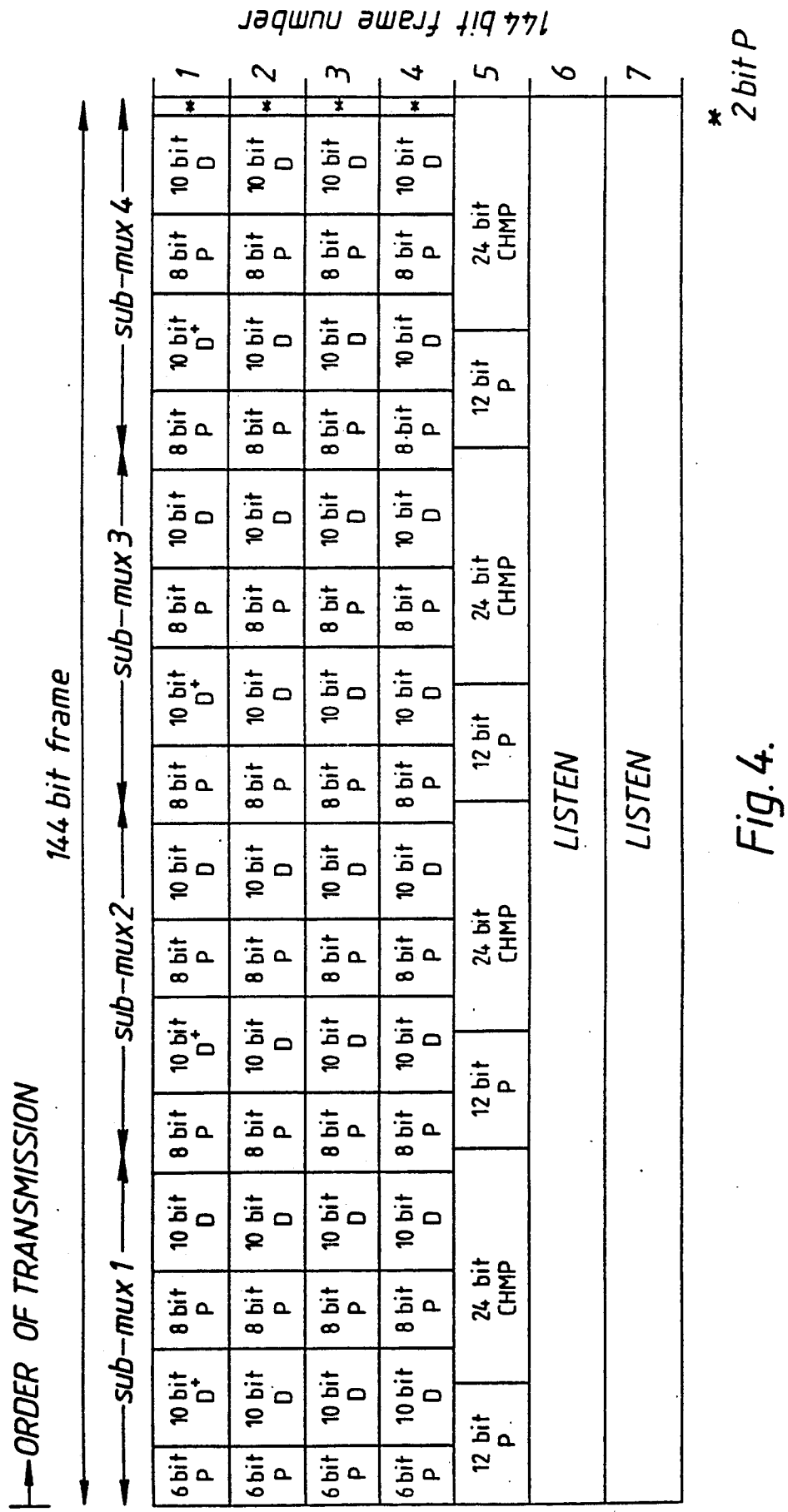
FIG. 4 shows the multiplex used to carry signalling and synchronization channels for link establishment from the portable unit to the base station.

According to the requirements of a particular situation or function, the proportion of the main channel bandwidth allocated to each of the above sub-channels may vary, and a sub-channel may be absent in some circumstances. Each different allocation of sub-channel bandwidths is termed a multiplex. Three multiplexes (known as multiplexes one, two and three) are used. They are illustrated in FIGS. 2, 3 and 4 respectively.

Channel Markers (CHM) and Synchronism Markers (SYNC)

Multiplexes two and three are used in situations where the base unit and cordless telephone have not yet gained burst synchronism. Special bit patterns are used in the SYN channel in order to mark an RF channel where a link set-up attempt is being made and/or to mark a particular time within the multiplex period in order to allow the units to gain burst synchronism. The patterns are all of 24-bit length and chosen to yield low auto-correlation and low cross correlation with other frequently-occurring bit patterns.

Patterns called channel markers CHM are used to mark transmissions within a base unit/cordless telephone connection which is attempting to initialize a radio link and also to mark a particular time within the multiplex. Patterns called synchronization markers SYNC are used when a link has already been established.

The channel marker CHM bit pattern sent by the base unit (specifically CHMF) is the bitwise inverse of the channel marker CHM pattern sent by the cordless telephone CT (specifically CHMP). Similarly SYNC sent by the CT (SYNCP) is the bitwise inverse of that sent by the base unit (SYNCF). CT's which expect to see CHMF or SYNCF are therefore unable to recognize marker patterns from other CT's, and base units BS are unable to recognize marker patterns from other base units.

The bit patterns for SYNCP, SYNCF, CHMP and CHMF are given overleaf:

|       | MSB (sent last)                    | LSB (sent first) |
|-------|------------------------------------|------------------|
| CHMF  | 1011.1110.0100.1110.0101.0000      | (BE4E50H)        |
| CHMPO | 100.0001.1011.0001.1010.1111       | (41B1AFH)        |
| SYNCF | 1110.1011.0001.1011.0000.0101      | (EB1B05H)        |
| SYNCP | 0001.0100.1110.0100.1111.1010      | (14E4FAH)        |

Multiplex One (Speech mode)

Multiplex one (FIG. 2) is used bi-directionally over an established link to carry the D and B channels. The SYN channel is non-existent in this multiplex and therefore should burst or bit synchronization be lost, it cannot be recovered without reinitializing the link.

Multiplex one supports both a 68 bit and 66 bit burst structure (referred to as MUX1.4 and MUX1.2 for signalling with four bits or two bits respectively). The raw data rates in this multiplex are 2.0 Kbits/s (MUX1.4) or 1.0 Kbits/s (MUX1.2) for the D channel and 32.0 Kbits/s for the B channel. All base units and cordless telephones must support at least MUX1.2. Support for MUX1.4 is optional: both ends of the cordless connection must support the higher signalling rate for it to be used.

Data bytes in the D channel are aligned in this multiplex so that bytes always start on a frame boundary.

Multiplex Two (Base to Handset)

MUX2 (FIG. 3) is used to carry the D and SYN channels for link establishment and re-establishment. The B channel is non-existent in MUX2. It is used prior to a switch to multiplex one.

MUX2 carries the D channel at a rate of 16.0 Kbit/s and the SYN channel at an overall rate of 17.0 Kbit/s.

The SYN channels consists of ten bits of preamble (one-zero transitions) followed by a channel marker (CHMF) or synchronism marker (SYNC: either SYNCF or SYNCP). The D channel data allows the cordless telephone CT to set up AGC (if used) and the preamble enables the cordless telephone CT to gain bit synchronization. The marker (CHM or SYNC) enables the base unit BU or cordless telephone CT to gain burst synchronization.

Data bytes in the D channel are aligned in this multiplex so that the D channel synchronization word, SYNCD, occurs as the first 16 bits in the D channel after the SYN channel. The alignment of the data in the SYN channel is specified in FIG. 3.

Multiplex Three (Handset to base)

MUX3 (FIG. 4), carrying the D and SYN channels, is used for link establishment and re-establishment in the direction cordless telephone to base unit. The B channel is non-existent in MUX3.

MUX3 repetitively transmits for 10 ms and receives for 4 ms. Responses from base units in MUX2 are detected during the receive slot. During transmission each sub-channel (D and SYN) is further sub-multiplexed by repetition four times over. This scheme enables the base unit to be able to receive one of the sub-multiplexes of the SYN and D channels from the cordless telephone.

The sub-multiplexed D channel comprises 20 bit words split into 10 bit sections surrounded by preamble in order to avoid CHM/SYNC emulation. The SYN channel contains a 12 bit preamble followed by a 24 bit CHMP or a 24 bit SYNCP.

Once the base unit has locked to the SYN channel of one submultiplex and recognized the correct identification code in the corresponding D channel, the base station will then attempt to reinitialize the link (from its own end), using MUX2 with SYNCF in the SYN channel.

Data bytes in the D channel are aligned in this multiplex so that the D channel synchronization word, SYNCD, occurs as the first sixteen bits in the D channel after the SYN channel. The alignment of the data in the SYN channel is specified in FIG. 4.

The transmit/receive symmetry of multiplexes one and two is not present in MUX3. The guard-time between the transmit period and the receive period (and vice-versa) is, however, the same.

Dynamic RF Channel Allocation Strategy

A free RF channel is selected by the control system either in response to a call request or when a previously selected free channel proves unsuitable for bi-directional communication.

Calling Channel Detection

Calling channel detection operates in one of two ways depending upon the unit which originates the call request. The two possibilities are that the base unit BS (master) originates the call which is then detected at the cordless telephone CT (slave); or that the call, originates at the cordless telephone CT (slave) and is detected at the base unit BS (master). The cordless telephone CT must track the base unit BS bit timing clock once a link is established.

(a) Calling Channel Detection at the Cordless Telephone

The cordless telephone CT expects to receive information formatted in MUX2. The process of calling channel detection on a single channel is as follows:
  i) On command from the cordless telephone CT control system, the RF synthesizer begins to switch to the new channel and eventually settles on the new centre frequency and begins receiving.
  ii) The presence of D (or SYN) channel data from the base unit BS allows any AGC system to settle. During preamble the system gains bit synchronization and then detects the CHM in the SYN channel of MUX2 from the base unit BS (CHMF in this case). D channel decoding then starts. Should CHMF not be detected within a suitable receive window then another channel may be examined.
  iii) Only when CHMF has been correctly detected and a recognized identification code found in the D channel, may a response be transmitted using MUX2 with SYNCP in the SYN channel and the contents of the LID field reflected back to the base unit. Channel scanning continues until either a valid incoming call is detected and established or the user initiates an outgoing call.

(b) Calling Channel Detection at the Base Unit

The base unit BS expects to receive information formatted in MUX3. The process of CHM detection is similar to that above except that:
  i) The receive window is known, a priori.
  ii) On command from the base unit BS control system, the RF synthesizer beings to switch to the new channel and eventually settles on the new centre frequency and begins receiving.
  iii) The presence of D (or SYN) channel data from the cordless telephone CT allows any AGC system to settle. During preamble the system gains bit synchronization and then attempts to detect CHMP in the SYN channel of MUX3. This is transmitted every seventh 144 bit cycle. D channel decoding then starts. Should CHMP not be detected within a suitable receive window then another channel maybe examined.
  iv) Only when CHMP has been correctly detected and a recognized Link end point identification code found in the D channel link identity LID field, may the link be reinitialized from the base unit BS using MUX2 with SYNCF in the SYN channel, and with the cordless telephone CT_own identity number and a call reference value (assigned by the base unit BS) in the link identity LID field.

Link Setup and Establishment

Upon identification of the RF channel upon which a call is taking place and verification of compatible link-end identification, digital link set-up can occur.

Link Setup from Base Unit to Cordless Telephone

Action at the base unit BS

When a link needs to be established to a cordless telephone CT (e.g. in response to an incoming call indication), the base unit BS shall acquire a free RF channel and begin transmitting (and receiving) in MUX2 over that channel (with CHMF in the SYN channel and PID, LID in the D channel). The transmission should last for a minimum of 1.4 seconds unless a response from a recognized cordless telephone CT is received. Two eventualities are possible:
  i) The Link is established when the base unit BS accepts a response from the target cordless telephone CT with the correct identification code before the expiry of the transmit time, and this is followed by the introduction of MUX1 and the B channel.
  ii) No recognized response is received before the expiry of the transmit time. In this case a new RF channel is selected and a further link set-up attempt is made on the new channel. The link establishment is also subject to a timeout period of sufficient length to cover the quiet period of ringing cadence. If no incoming ringing is detected for this timeout period, then link establishment must cease. All link establishment requests other than those initiated by incoming ringing detection shall be subject to a single timeout period, or until the link establishment request ceases, whichever is shorter.

Action at the Cordless Telephone CT

The cordless telephone CT should normally check every channel periodically for the presence of CHMF. On detection of CHMF in the SYN channel and a matching PID in the D channel, the cordless telephone CT will respond using MUX2 with SYNCP in the SYN channel and ID in the D channel.

Link Setup from a Cordless Telephone to a Base Station

Action at the Cordless Telephone CT

When a link needs to be established to a base station BS, the cordless telephone CT acquires a free RF channel and begins transmitting in MUX3 over that channel (with CHMP in the SYN channel and PID, LID in the D channel) and listening for MUX2 over that channel. The transmission cycle period should last for a minimum of 750 ms unless a response from a recognized base unit is received. Two eventualities are possible:
  i) A one-way link is established when the base unit BS has detected the CHMP from the cordless telephone CT and checks PID, LID. The base unit then replies using MUX2 with SYNCF in the SYN Channel, for a period between 56 ms and 84 ms. The cordless telephone CT synchronizes to the SYNCF of MUX2 during its receive slots in multiplex three and then responds in MUX2 with SYNCP in the SYN channel. Finally the B channel is introduced in multiplex one.
  ii) No recognized response is received before the expiry of the transmit time. In this case a new RF channel is selected and a further link set-up attempt is made on the new channel. This may be repeated for a total of five channel attempts. If a period of 5.0 s expires before a link is successfully established, no further link setups will be attempted until the initiation of a new call attempt.

Action at the base unit BS

The base unit CT should normally check every channel periodically for the presence of CHMP. On detection of CHMP in the SYN channel and a suitable end point ID in the LID field of the D channel, the base unit BS will respond using MUX2 with SYNCF in the SYN channel and PID plus a call reference ID in the LID field of the D channel, for a period of between 56 ms and 84 ms.

The link set-up operations use an exchange of fixed length format single address words and the actual signalling sequence for a link set up from the base unit to a cordless telephone will be considered now in more detail.

Detailed Consideration of Base Unit to Cordless Telephone Call Set-up

Ringing can be activated to either a single cordless telephone or to a number of cordless telephones within a registered group. The mechanism is identical in either case in that a single cordless telephone is treated as a multiple group limited to one. Multiple ringing is a point to multipoint (or single point for a group of one) link setup attempt that reverts to a point to point link only when the base unit BS detects a special poll response from a cordless telephone CT called a 'link-request' poll response (to answer the call). There are four requirements for multiple ringing:
  i) Packets from base unit BS to cordless telephone CT during ringing will be restricted to single ACW packets.
  ii) Poll packets from the base unit BS containing the LID will be repeated every other packet (ACW), with a single ACW (UI) or the equivalent time of IDLE_D between them to enable the cordless telephone CT to detect a base identity code (BID).
  iii) The poll response from the cordless telephone CT is a single ACW.
  iv) The poll response ACW will be transmitted from the cordless telephone CT in a transmit burst following the end of the receive burst containing the poll packet. This poll response packet shall start from between 2 ms and 12 ms after the end of the received poll (to allow time to set up the poll response ACW for the transmit burst).

The base unit BS transmits 'poll' ACW's to each cordless telephone CT that is required to be called within a group. The poll packet serves a dual purpose:
  i) To provide a 'group calling' address using a LID to enable all cordless telephones CT registered with that LID to recognize this LID and so wait on the channel for reception of an individual cordless telephone CT poll. This poll waiting timeout is 384 ms.
  ii) To address, or poll each cordless telephone CT in the group calling list individually with a PID so that each cordless telephone CT can respond to its poll in the appropriate response slot.

The base unit BS transmits a fixed format poll ACW and an optional variable format packet (e.g. alternately SIG (ring on/off) and (FI) in MUX2 on a continuous repeated basis so that a number of CPPs are polled within a 384 ms period (e.g. POLL1, SIG, POLL2, FI, POLL3, SIG, ..., POLL32, FI). A cordless telephone CT will act on unacknowledged layer three (e.g. SIG and F1) packets received only when it has recognised its own PID from a poll.

The base unit BS transmits poll and interleaved, SIG or FI, packets continuously (using CHMF in the SYN channel) so that all registered cordless telephones CT in the ringing list are polled, and monitors for cordless telephone CT responses in MUX2.

The cordless telephone CT transmission of responses is constrained by a transmit window that is the period between poll packets from the base unit BS; this is to avoid cordless telephone CT poll response collisions.

The poll packet contains the LID field (for Group Call Identification at the cordless telephone CT) and a PID (for one of the group registered cordless telephone CT). SR bit is set to request the signalling rate for multiplex 1 (SR=SRr).

The cordless telephone CT detects the MUX2 CHMF from the base unit BS during its calling channel scan. It waits for 19 ms maximum to receive a poll ACW. If a SIG OR FI packet is received before a poll ACW, it is ignored. If a poll is received, the PID in the poll ACW is compared with the stored PID. If they match, the cordless telephone CT transmits a poll response back to the base unit BU within the response 'timeslot', and may act on subsequently received layer three UI packets (e.g. SIG or FI). If the PID does not match, the LID is checked with the stored LID, and if they match, this 'arms' the cordless telephone CT to continue to monitor the channel for up to 384 ms to detect its own poll ACW (if it does not detect its own PID it continues to channel scan). If the cordless telephone CT subsequently receives a poll containing its PID, this enables the cordless telephone CT to decode all subsequent UI packets (e.g. SIG, to start ringing). A cordless telephone CT which has not received further poll messages within 1 s. shall revert to channel scanning.

The cordless telephone CT has three possible responses to a poll from the base unit BU:
  i) A normal poll response containing PID and LID (set equal to received LID, i.e. handshake);
  ii) A link-request ACW. The link-request packet is sent only after the cordless telephone CT user takes the Call.
  iii) A 'link decline' request. This is a request from the cordless telephone CT not to be polled further. The ACW is similar to the poll response ACW but with a value of 400H in the LID field.

The Cordless telephone CT Poll response ACW is transmitted in MUX2 (using SYNCP in the SYN channel), and contains the PID and LID.

The poll response transmission will be started from the cordless telephone CT from between 2 ms and 12 ms after the end of the poll ACW from the Base Station.

The Base Station waits for cordless telephone CT responses to the poll ACW, and monitors for MUX2 with SYNCP in the SYN channel. If a poll response is detected, the LS bits and LID field indicate whether the message response is a poll response/link decline or link request.

If the cordless telephone CT has answered the Call, the SR bit in the poll response ACW indicates the Multiplex 1 rate selected (commanded) by the cordless telephone CT (SR=SRr). The Base Station transmits a fixed format packet back to the cordless telephone CT in MUX2 (continuously). The Base Station is then armed to signal at the commanded rate when in multiplex 1. If the cordless telephone CT has returned a poll response without answering the Call, the base unit BU logs the response. If all cordless telephones CT on the current group ringing list have responded to their polls, the base unit BU replaces CHMF by SYNCF in the SYN channel to prevent unnecessary wake-up of other cordless telephones CT in range.

If the cordless telephone CT detects the above ACW from the base unit BU, this indicates that there is a point-to-point link setup between this cordless telephone CT and base unit BU, and the cordless telephone CT attempts protocol initialization. The CT transmits SABM (link initialise) supervisory messages in Multiplex 1.

If the base unit BU detects a SABM it stops transmitting the fixed format packet (as described above), transmits an acknowledgement in Multiplex 1 mode, and initializes the link state variables V(s) and V(r) and sets $DL_{13}$ ESTABLISH_IND.

During the above signalling sequence it will be recognized that the polling procedure is interspersed with a signalling sequence which involves a "ringing on" or "ringing off" signal which may advantageously follow the ringing cadence.

The base station base unit BU, however, is arranged to delay the application of the ringing signalling sequence until a predetermined period has elapsed from the commencement of the polling sequence regardless of the responses received from the cordless telephones CTs, or until poll responses have been received from all polled cordless telephones CTs, whichever is shorter. This period is arranged to be of the order of 1.8 seconds during which all ringing signals of the polling sequence are held at ringing off. The predetermined period is arranged relative to the cordless telephone wake-up period of 1.4 seconds.

Figure 5:
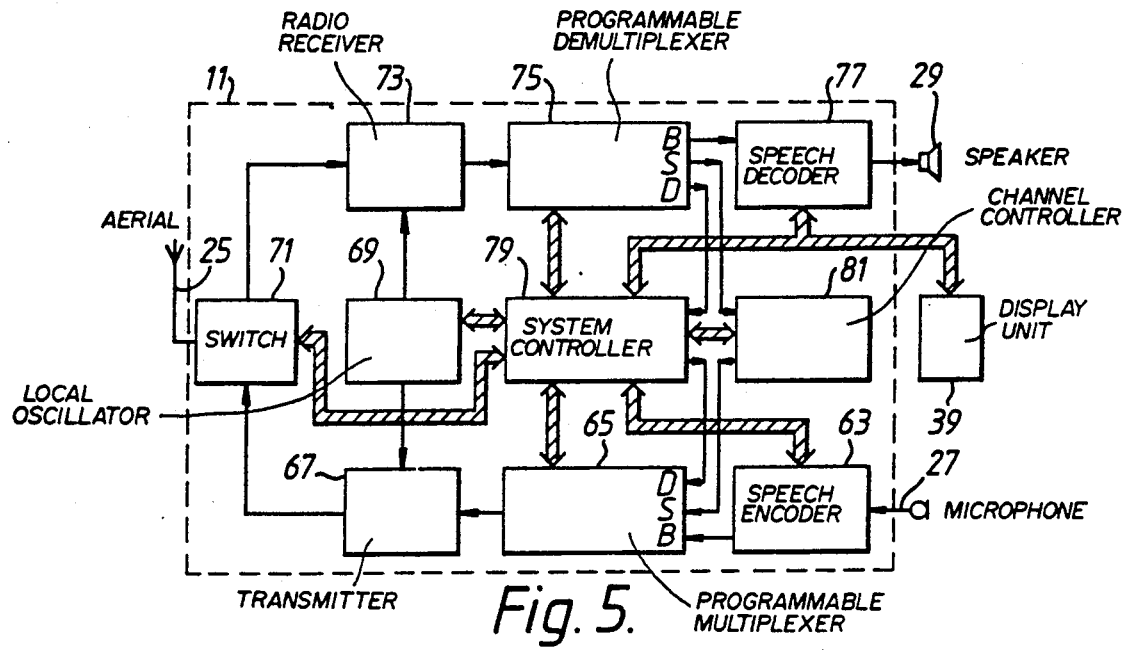
FIG. 5 shows a block diagram of a handset control circuit.

Referring to FIG. 5, a block diagram of the control circuitry of a handset 11 (cordless telephone CT) is shown. Speech sounds received by the microphone 27 are converted into an electrical signal which is provided to a speech encoder 63. The speech encoder 63 includes an analogue-to-digital converter which converts the analogue electrical signal from the microphone 27 into 8-bit digital signals with a sampling rate of 8 KHz. This results in a total bit rate of 64 Kbit per second pulse code modulation (PCM).

The 8-bit PCM data words are then compressed to 4-bit data words, in Adaptive Differential Pulse Code Modulation (ADPCM). In this coding system, each 4-bit word represents the change in value between the successive samples, rather than the absolute sample values themselves. This is an effective data compression technique for signals which change relatively slowly, such as speech signals. The 32 Kbit per second data stream provides the contents of the B channel, and is presented to a B channel input of a programmable multiplexer 65.

The programmable multiplexer 65 also receives D channel data and S channel data at respective inputs. While the handset 11 is operating in multiplex 1, the programmable multiplexer stores the continuously received 32 Kbit per second data stream from the speech encoder 63. The programmable multiplexer 65 outputs data in bursts, in accordance with the burst mode operation of the radio link, at 72 Kbit per second in accordance with the data rate of the radio link. Thus, once in each 2 ms burst period, the programmable multiplexer will output 64 bits of B channel data previously received from speech encoder 63 and stored, and will sandwich the B channel data between 2 or 4 bits of D channel data to form the multiplex 1.2 or multiplex 1.4 data stream.

The data stream burst from the programmable multiplexer 65 is provided to a transmitter 67, which modulates the radio carrier frequency, received from a local oscillator 69, in accordance with the received data stream. The resulting radio frequency burst is provided to the aerial 25 via a transmit/receive switch 71. The transmit/receive switch 71 connects the transmitter 67 to the aerial 25 during the transmit part of each burst period and connects the aerial 25 to a radio receiver 73 during the receive part of each burst period.

During the receive part of each burst period, the receiver 73 demodulates the received signal from the aerial 25, using a carrier frequency signal from the local oscillator 69. The demodulated 72 Kbit per second data stream burst is provided by the receiver 73 and presented to a programmable demultiplexer 75.

The programmable demultiplexer 75 allocates the received data bits between the B channel, the S channel and the D channel in accordance with the multiplex structure in which the handset 11 is currently operating. When the handset is operating in multiplex 1, the 64 B channel bits received in each data burst are stored in the programmable demultiplexer 75, and are then output to a speech decoder 77.

The programmable demultiplexer 75 or speech decoder 77 repeats the pattern of bit reversals applied to the B channel data by the encoder in the base station 3, to obtain the correct data values. The speech decoder 77 then performs the inverse of the ADPCM algorithm used to encode the speech data, so as to obtain 8-bit words at a rate of 8 Kword per second. The speech decoder then converts this digital data to analogue data in a digital-to-analogue signal to the speaker 29. The speaker 29 converts the analogue electric signal to sound to be heard by the user.

During multiplex 1 operation, the speech encoder 63 provides B channel data to the programmable multiplexer 65 at 32 Kbit per second. Thus in each 2 ms burst period, the programmable multiplexer 1 burst carries 64 B channel bits, the radio link carries the B channel at an effective average bit rate equal to the bit rate provided by the speech encoder 63. Similarly, the effective average bit rate of received B channel data matches the bit rate of the continuous data transmission from the programmable demultiplexer 75 to the speech decoder 77. Thus, there is an effective continuous bidirectional B channel communication, in spite of the time division duplex burst mode nature of the radio link.

The operation of the handset is controlled by a system controller 79, and the timing of operations is controlled, in order to ensure burst synchronization, in response to signals from an S channel controller 81. The system controller 79 is typically a microprocessor-based or microcomputer-based control system, including a processor, a program memory and a random access memory. The S channel controller 81 may be implemented as a separate microprocessor or may be implemented in software for the same processor as the system controller 79.

The system controller 79 sends control signals to the programmable multiplexer 65 and the programmable demultiplexer 75, to instruct them which multiplex structure to adopt, and also to give them timing signals so that they are properly synchronized with the radio link burst structure. The programmable multiplexer 65 and programmable demultiplexer 75 may also send signals to the system controller 79 to inform it if a buffer used to store the data signals in the multiplexer or demultiplexer is approaching overflow or is empty.

Control signals from the system controller 79 control the transmit/receive switch 71, so that it connects the transmitter 67 and the receiver 73 to the aerial 25 alternately with the correct timing.

The system controller 79 selects the radio channel on which the handset 11 is operating at any given moment, and instructs the local oscillator 69 to generate a signal for the transmitter 67 and receiver 73 at the appropriate frequency. In a system intended for use in the UK in accordance with the regulations issued by the Department of Trade and Industry, the handset 11 may operate on any one of forty channels having carrier frequencies at 100 KHz spacing in the range 864.15 MHz to 868.05 MHz. The system controller 79 will inform the local oscillator 69 which channel has been selected, and the local oscillator 69 will inform the system controller 79 when its output signal has reached the selected frequency.

The system controller 79 also controls the D channel. It receives incoming D channel data from the programmable demultiplexer 75 and provides outgoing D channel data for transmission to the programmable multiplexer 65. Some received D channel data is used purely to control the operation of the system controller 79, and some transmitted D channel data is generated within the system controller 79. Such data includes transmitted and received handshake signals and various identification signals which are exchanged between the handset 11 and a base station 3 during the establishment of a radio link. However, other types of transmitted D channel data will result from actions taken by the user, and other types of received D channel data must be passed on to the user. For this reason, the system controller 79 also has a control signal connection with a keypad and possibly a display unit (not shown).

When a user is initiating a telephone call from the handset 11, the telephone number to be dialed will be entered through the keypad (not shown). The key depressions will be notified by the keypad/display unit 39 to the system controller 79, which will encode them for transmission in the D channel. In this way, the base station 3 is informed of the telephone number dialed by the user, and can transmit the appropriate, dialing signal to the telecommunications network 1.

When the user of the handset 11 wishes to initiate a call, and therefore presses one of the keys on the keypad, the keypad/display unit 39 will notify this to the system controller 79. The system controller 79 searches through the RF channels, by changing the frequency of the local oscillator 69, until an appropriate channel is found. The system controller 79 then instructs the programmable multiplexer 65 to operate in multiplex 3, and instructs the S channel controller 81 to provide the portable part channel marker CHMP to the programmable multiplexer 65 as the S channel synchronization word. The transmit receive switch 71 is controlled to connect the aerial 25 to the transmitter 67 and the receiver 63 in the pattern required for multiplex 3 operation, and the system controller 79 ensures that the switching of the transmit/receive switch 71 is synchronized with the multiplex 3 operation of the programmable multiplexer 65.

During receive periods, the programmable demultiplexer 75 passes any received data to the S channel controller 81. The received data should include SYNCF. When this synchronization word is identified, the S channel controller 81 provides the system controller 79 with the burst timing of the received signals. The system controller 79 then instructs the programmable demultiplexer 75 to decode received data as multiplex 2, in accordance with the received burst timing. Once the received channel data has been decoded by the system controller 79, it will instruct the programmable multiplexer 65 to switch to multiplex 2 with timing synchronized with the burst timing information from the S channel controller 81 to provide SYNCP to the programmable multiplexer 65 in place of CHMP.

Figure 6:
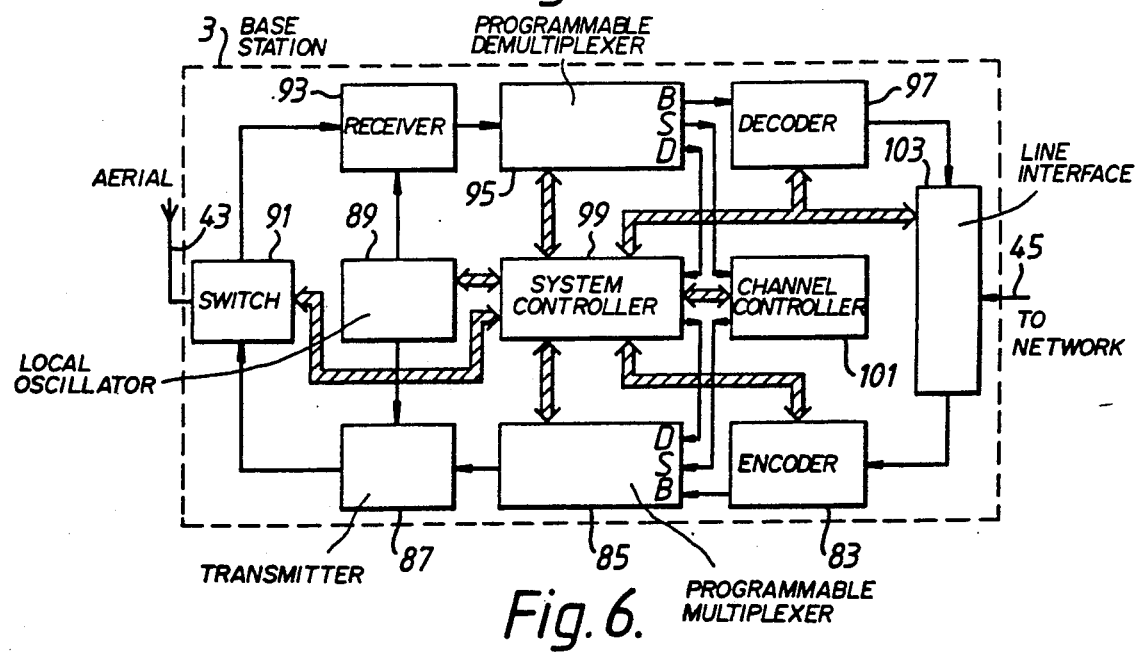
FIG. 6 shows a block diagram of a base station control circuit.

FIG. 6 shows a schematic block diagram of a base station 3, e.g. (BS1, FIG. 1).

The programmable multiplexer 85, the transmitter 87, the local oscillator 89, the transmit/receive switch 91, the receiver 93 and the programmable demultiplexer 95 are substantially identical with the corresponding parts in the handset 11. The S channel controller 101 of the base station 3 is also similar to the S channel controller 81 of the handset 11, except that the base station S channel controller 101 is designed to recognize CHMP and SYNCP in the incoming S channel data, and to provide CHMF and SYNCF to the programmable multiplexer for transmission, instead of the other way around.

The operation of the system controller 99 is generally similar to the operation of the system controller 79 of the handset 11.

When the base station 3 is scanning the radio channels to detect whether a handset 11 is calling it, it expects the handset 11 to be calling using multiplex 3. Accordingly, once the S channel controller 101 has notified the system controller 99 that the handset channel marker CHMP has been received, the system controller 99 will instruct the programmable demultiplexer 95 to treat incoming signals as having the data structure of multiplex 3. Once the base station 3 has sent a reply to a received multiplex 3 signal, it expects the handset 11 to change to multiplex 2, and therefore it will instruct the programmable demultiplexer 95 accordingly at this time.

Since the burst timing of the handset 11 is slaved to the timing of the base station 3, except during multiplex 3 transmissions, the timing information received by the system controller 99 from the S channel controller 101 is not used to control the timing of the operations of the programmable multiplexer 85. The timing of the programmable multiplexer 85 and the transmit/receive switch 91 is determined by an internal clock of the system controller 99. However the programmable demultiplexer 95 is controlled in accordance with the received burst timing, both to enable correct decoding of multiplex 3 transmissions from a handset 11 and to compensate for the effect of RF transmission delays on transmissions from the handset 11. The system controller 99 may also use synchronization timing information from the S channel controller 101 as one way of determining that a communication link with a handset 11 has broken down through loss of burst synchronization.

An area in which the operations of the system controller 99 in the base station 3 are different from the operation of the system controller 79 in the handset 11 is in its processing of D channel data. The signalling data received by the base station 3 from the telecommunications network will be different from the signalling data input to the handset 11 by a user, and there will be corresponding differences in the D channel data received by each part over the radio link. Accordingly, the programming of the system controller 99 in the details of its handling of D channel data will be different.

Also, the actions taken by the base station 3 during link initiation are different from the actions of the handset 11, and so the respective system controllers 99, 79 will be programmed differently in this respect.

The base station control circuit includes a line interface 103, to which the telephone connection 45 is made from network 1. Signalling data output by the system controller 99, typically in response to received D channel data, is conditioned by the line interface 103 and placed on the telephone connection 45. Signals received from the telecommunications network over the telephone connection 45 are similarly interpreted by the line interface 103 and provided to the system controller 99 as required. The line interface 103 also receives the decoded B channel data stream from the decoder 97 and places this on the telephone connection 45, and receives the speech or other communications signals from the telephone connection 45 and provides these to the encoder 83.

The manner of operation of the line interface 103 will be chosen in accordance with the nature of the telecommunications network to which the base station 3 is connected. In particular, if the base station 3 is connected to a conventional PSTN, the line interface 103 will send and receive analogue signals over the telephone connection 45, whereas if the base station 3 is connected to an ISDN, the line interface 103 will normally be required to send and receive 64 Kbit per second pulse mode modulated signals.

In order to allow the base station 3 to communicate with various different types of handset 11, the encoder 83 and decoder 97 are enabled to carry out various encoding and decoding operations. They may be able to use a plurality of different adaptive differential pulse code modulation algorithms. They may also be able to use a digital data processing algorithm or to pass signals through unaltered to enable the base station 3 to be usable with portable computer and computer terminal type handsets 11. During the link set up procedure, while the base station 3 and the handset 11 are communicating in multiplex 2, the handset 11 can indicate through the D channel the type of coding and decoding it requires, and the system controller 99 of the base station 3 will then control the encoder 83 and decoder 97 to operate accordingly once multiplex 1 transmissions have begun.

Link Initiation Procedure

Figure 7:
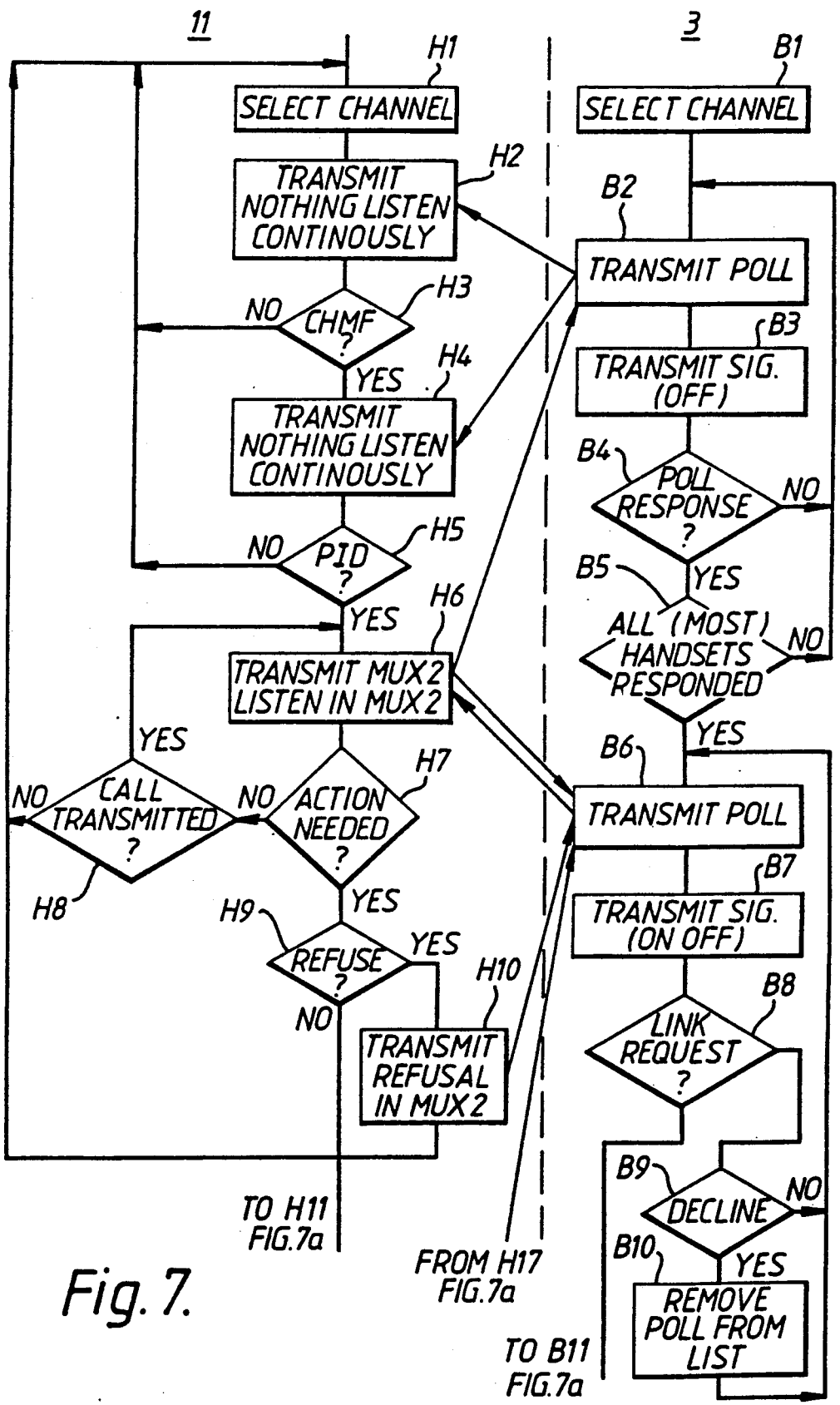
FIGS. 7 and 7a show a flow diagram of the actions taken by a handset and base station, when the base station initiates a link, and, FIG. 8 shows a schematic diagram of the exchange of signals between a handset and base station, when a base station initiates a call.
Figure 7A:
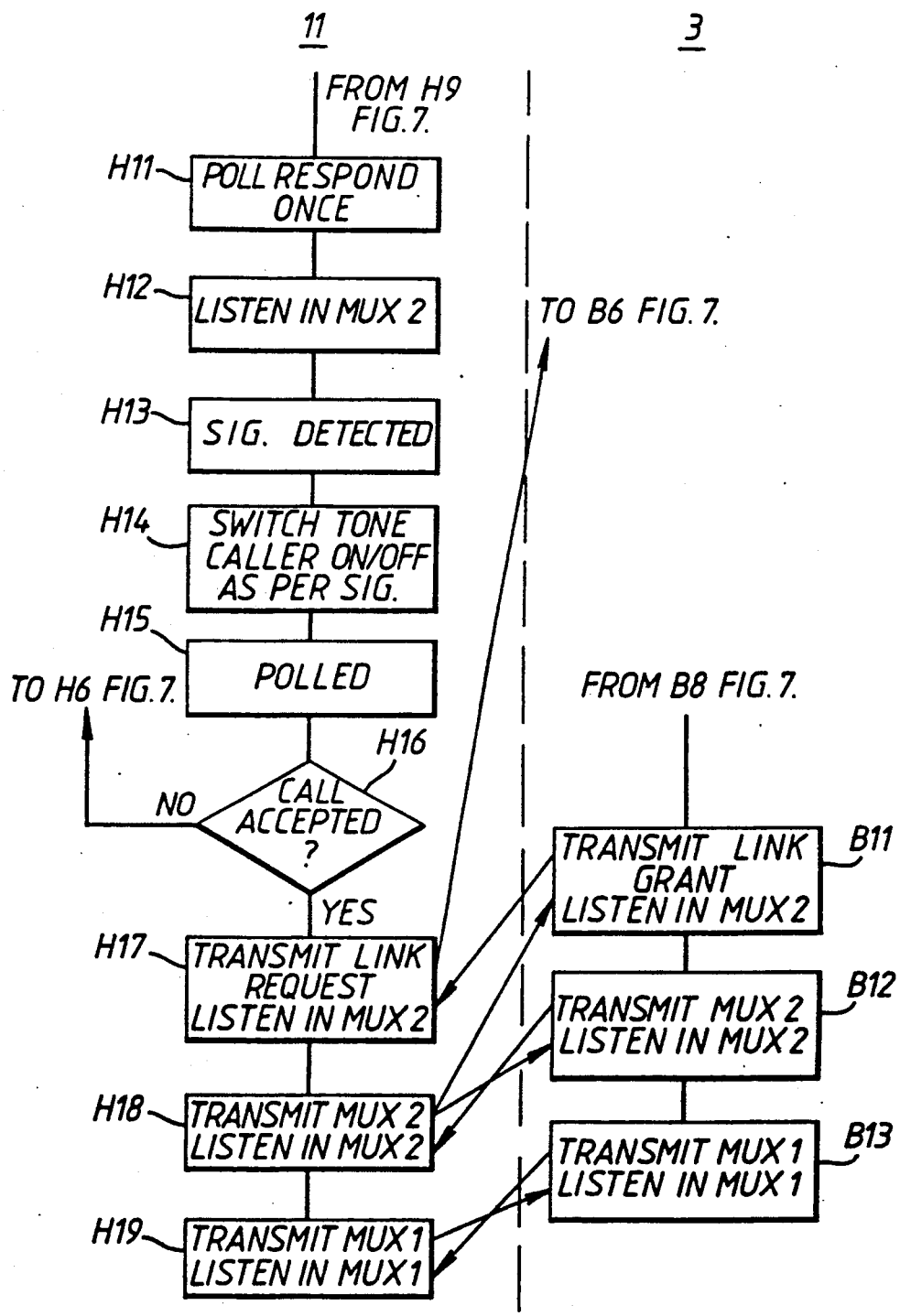
Figure 8:
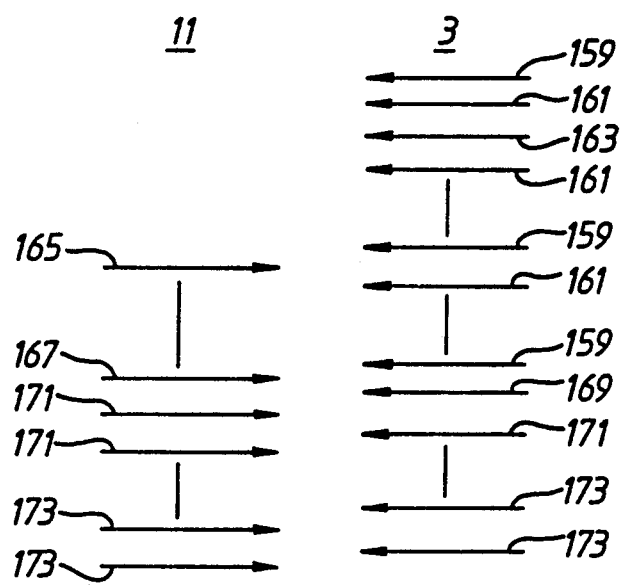

FIGS. 7 and 7a show in flow diagram form the actions taken by the handset 11 and the base station 3 when the base station 3 initiates a link with the handset 11. FIG. 8 shows the pattern of data burst transmissions during this process.

While the handset is turned on, but is not participating in a link, it performs a channel-scanning loop. In step H1 it selects the next channel to scan. In step H2 it transmits nothing on the selected channel, but connects its aerial 25 to the receiver 73. The programmable demultiplex 75 passes any input data to the S channel controller 81. If the S channel controller 81 fails to detect the fixed part channel marker S channel synchronization word CHMF within a predetermined period, the handset 11 abandons the channel in step H3, and returns to step H1 to select the next channel. If all channels are scanned in turn without CHMF being detected, the handset 11 may cease operations for a period to conserve battery power, before scanning the channels again.

While a base station 3 is also not participating in a link, it will be performing a similar scanning operation. This scanning operation will be interrupted if the base station 3 receives a signal such as a telephone ringing signal on the telephone connection 45, indicating that it is required to set up a link with a handset 11. In this case, the base station will scan the available radio channels in step B1 to find an empty channel.

The base station 3 will then begin to transmit a poll signal using multiplex 2, in step B2, to a plurality of handsets, and in step B3 to transmit an OFF signal, instructing the handsets not to ring. Between multiplex 2 transmission bursts, the base station 3 will connect its aerial 43 to its receiver 93, to detect replies from handsets 11 using the multiplex 2 data structure with the SYNCP S channel synchronisation word.

In its multiplex 2 transmission in step B2, the base station 3 will transmit D channel data in a predetermined D channel code word format. A D channel code word will take several multiplex 2 data bursts to be transmitted.

The D channel code word transmitted by the base station 3 includes a PID field in which a "portable part identification" code is placed by the base station 3 identifying the specific handset 11 it wishes to contact. The D channel code word also contains a LID field, in which the base station 3 places a "link identification" code. Various different link identification codes may be used under different circumstances. When the base station 3 is attempting to set up a link, the code placed in the LID field will be a base identification code (BID), identifying the base station 3.

In the multiplex 2 transmissions by the base station 3 in step B2, the D channel information which the base station 3 wishes to transmit is repeated continuously. If the base station 3 wishes to direct its signals to more than one handset 11, then it will change the PID code in successive transmissions of the D channel data so as to call each of the handsets in turn.

When the channel selected by the handset 11 in step H1 is the same channel as was selected by the base station 3 in step B1, the handset 11 will detect in step H2 the multiplex 2 transmissions by the base station 3 in step B2. Therefore, the handset 11 will find a CHMF code, and will move to H4. In this step, the handset 11 uses the received CHMF code to achieve burst synchronization with the base station 3, and the system controller 79 instructs the programmable demultiplexer 75 to treat received data as being in multiplex 2. Accordingly, the multiplex 2 transmissions from the base station 3 are decoded and the D channel data is passed to the system controller 79.

The system controller 79 assembles the D channel code words being transmitted by the base station 3, and examines the PID and LID fields. If the system controller 79 does not detect its own PID code within a time-out period, then in step H5 the handset will conclude that the received call from the base station 3 is not intended for it, and it will return to step H1.

The system controller 79 may also determine when the sequence of PID codes, transmitted by the base station 3, is repeated. When this happens, the system controller 79 should have decoded every PID code being transmitted, and so if its own PID code has not been detected by this time, the handset 11 may return to step H1 from step H5 even if the time-out period has not expired.

If, in step H5, the handset 11 decides to respond to the call from the base station 3, because it has recognized its own PID code, it moves to step H6. In this step, it begins to transmit in multiplex 2 as well as listen for multiplex 2 transmissions from the base station 3. The handset 11 will place the SYNCP synchronization word in the S channel, since it is responding to the base station 3 rather than initiating its own call. It will use the D channel to transmit a reply code word, in which it will place its own identification code in the PID field, and will place in the LID field the same code as was received in that field in the transmissions from the base station 3.

To avoid interference between two or more handsets 11 transmitting on the same channel simultaneously, in response to a series of call signals from the base station 3 identifying several handsets 11, the handset 11 will transmit its reply immediately after it has received a D channel message containing its own PID code, and not after receiving a D channel message containing another PID code. In step B4, if the base station 3 does not detect a poll response it returns to step B2.

If the base station 3 detects a poll response to its transmissions in step B2, it will check that the received S channel synchronization word is SYNCP, and decode the received D channel information to check that it recognizes the returned PID code, and that the returned LID code is the same as it sent out. The base station then passes to step B5, where it determines whether all or most handsets have responded. If they have not, the base station 3 returns to step B2. If the base station determines in step B5 that a satisfactory reply has been received, it proceed to step B6. It continues to transmit its call to the handset or handsets, using multiplex 2. If satisfactory replies are received from all the handsets which are being called, the base station 3 replaces CHMF in the S channel with SYNCF, to avoid alerting any further handsets 11 unnecessarily.

In step B7, the base station transmits the instruction to the handsets to begin or stop ringing as required.

Once a handset 11 has identified that a base station 3 is transmitting a call to it, it can take action either to accept the call or to decline it. It may decline it either in response to some action by the user or it may have been pre-set to decline calls, for example through a function similar to the known "do not disturb" function on a conventional telephone. A call will not be accepted until the user presses one of the link control keys (not shown) on the handset keypad (not shown).

Accordingly, in step H7 the handset 11 determines whether any action is required. If no action is needed, it passes to step H8 at which it determines whether the base station 3 is still transmitting the call. The base station 3 may cease to transmit the call either by entering a link with another of the handsets 11, and changing the transmitted multiplex 2 message accordingly, or by ceasing to transmit on the channel because no handset 11 has accepted the call within a pre-set period. If the call is no longer being transmitted, the handset 11 returns to step H1 and once again scans the channels for a fresh call to it.

If it is determined in step H7 that action is required, the handset passes to step H9 to determine what the required action is. If the required action is to refuse the call, it passes to step H10.

In step H10 the handset 11 continues to transmit in multiplex 2, but changes the code in the LID field to a special "link decline" code. It continues to transmit its own identity code in the PID field of the D channel. If the base station 3 receives a "link decline" message in step B6, it may remove the associated PID code from the list of PID codes which are being called in rotation by the base station 3. The handset 11 remains in step H10, and transmits the "link decline" code in response to detecting its PID until a time-out period of e.g. 1 second has passed without its own PID being received. This confirms to the handset 11 that the base station 3 has received the "link decline" message and has stopped transmitting this PID code. The handset 11 then returns to step H1, and resumes scanning channels for further messages indicating that a base station 3 is attempting to set up a link. Because the base station 3 with which it was previously in communication is no longer transmitting the PID code of this particular handset 11, the handset will not respond again to the base station 3 even when it scans the channel being used by the base station, as it will determine in step H5 that its PID is not being transmitted.

If in step H9 the call is not refused, the handset 11, in step H 11, responds to the poll, and passes to step H12 where it listens in MUX 2. In step H13, the handset 11 acknowledges detection of the instruction SIG, and in step H14 it switches its tone call on or off in accordance with the instruction SIG. If in step H14, the handset 11 is polled, as determined by step H15, the handset 11 determines in step H16 whether the call is accepted. If it is not the handset 11 returns to step H6. If the call is accepted the handset 11 passes to step H17.

If the handset determines in step H16 that the required action is to accept the call, it passes to step H17. In this step, it continues to transmit in multiplex 2, sending the same PID and LID codes in the D channel as in step H6. However, instead of transmitting its normal handshake code, it transmits a special handshake code indicating "link request". It continues to decode the multiplex 2 transmissions from the base station 3, in order to receive the reply from the base station 3 to the link request.

In step B8, the base station 3 determines whether it has received a link request message from any of the handsets 11 it has been calling. If no link request is received within a pre-set period, the base station 3 passes to step B9, and abandons the attempt to set up a link and passes to step B10 where the poll is removed from the list and the base station 3 returns to step B6. If the link attempt is not abandoned the base station returns to step B6. If a link request is received, the base station 3 moves to step B11.

Since the base station 3 is now entering a link, it will change the S channel synchronization word in its multiplex 2 transmissions from CHMF and SYNCF, if this has not already been done in step B6. It will transmit a reply to the handset 11 in which it replaces its normal handshake code in the D channel with a "link grant" code. In the PID field of the D channel code word, the base station 3 will transmit the identification code for the handset 11 to which it is granting the link.

In the LID field, it will transmit a different link identity code from the code transmitted in steps B2 and B6. The new LID code is an arbitrarily chosen code which identifies this specific link between the base station 3 and the handset 11. If it ever becomes necessary to re-establish the link, the handset 11 will transmit link reestablishment messages using the new LID code. This enables the handset transmissions under these circumstances to be identified as an attempt at link re-establishment, and distinguished from a call from the handset to set up a new link. If the original base identification code was used as the LID code throughout an established link, this would increase the possibility that a link reestablishment message from a handset 11 would be misinterpreted by a base station 3 as a call to set up a new link.

When the handset 11 in step H17 receives the link grant message from the base station 3, it passes to step H18. It will stop transmitting the link request, and will change the code transmitted in the LID field of the D channel to the new code sent by the base station 3.

Once the base station 3 in step B11, has received a transmission from the handset 3 returning the new LID code, it knows that the link grant message has been received. Accordingly, the base station 3 moves to step B12. Once the handset 11 has reached step H18 and the base station 3 has reached B12, the link between them is established, and they communicate with each other in multiplex 2. Subsequently, the base station 3 may instruct multiplex 1 communication to begin. In response, the handset 11 moves to step H19. Once the base station 3 receives multiplex 1 transmissions from the handset 11, it moves to step B13. B channel transmission may now begin.

The multiplex 2 transmissions between the handset 11 and the base station 3 include codes indicating whether each side can support multiplex 1.4, and following this exchange the two parts agree on whether to use multiplex 1.2 or multiplex 1.4 before moving to steps H19 and B13.

FIG. 8 shows schematically the exchange of signals between the handset 11 and the base station 3 when the base station 3 sends out a call which is accepted by the handset 11.

First, the base station 3 uses multiplex 2 to transmit a D channel message 159, sending a call to a first handset 11. Next, the base station 3 sends out a D channel message using multiplex 2 providing further D channel information, which any receiving handset may use. This may include data to be displayed on the display (not shown) of the handset to provide the user with information about the call, or may include a D channel instruction to the handsets to provide a call signal to the user corresponding to the normal ringing of the telephone. Next, the base station 3 sends out a D channel code word 163 using multiplex 2, calling a second handset. It then repeats the D channel message 161. The base station continues to alternate between calling handsets and sending the general D channel message 161, calling each handset of a group of handsets in turn.

At some point the first handset 11 receives these messages from the base station 3. Following the next transmission of the D channel word 159 calling the first handset, it replies by sending a D channel word 165.

The base station 3 continues to send out the D channel words 159, 163, calling all the handsets in turn, interleaved with the D channel message 161, and the first handset continues to send its reply message 165 in response to receiving each call message 159 directed to it, until the handset user indicates that the call should be accepted. Following the next transmission of the D channel word 159 calling the first handset, the handset 11 sends a link request message 167. The base station 3 replies with a link grant message 169, and the link is established.

The base station 3 and the handset 11 then exchange D channel words 171 using multiplex 2, until the base station 3 instructs the change to multiplex 1. They then exchange multiplex 1 transmissions 173, carrying the B channel and the telephone conversation begins.

We claim:

1. A telecommunication system comprising a plurality of distributed base stations each operatively coupled to a public switched telecommunications network wherein each base station is adapted to co-operate with one or more of a plurality of portable cordless telephone units by way of a plurality of cordless digital communication channels operating on a time division duplex basis characterized in that the plurality of base stations are arranged, upon detection of an incoming public switched network call, to poll all the plurality of portable cordless telephone units by transmitting on a repetitious basis an identity of portable units of said plurality of portable cordless telephone units to be connected to the incoming call on a selected channel and the base stations are arranged to intersperse each poll operation with a signalling message, and each portable unit is arranged to scan the cordless channels at a predetermined interval and the base stations are adapted to postpone the sending of a ringing message to any of the portable units until a predetermined period since the commencement of the polling action has elapsed, whereby the portable units are instructed to start ringing simultaneously, the predetermined period being substantially similar to but larger than the predetermined interval.

2. A telecommunications system as claimed in claim 1, wherein the signalling message is used by the base station to instruct each portable unit which has been polled not to activate a tone caller provided in each portable unit.

3. A telecommunications system as claimed in claim 2, wherein the signalling message is further used by the base station to simultaneously instruct each portable unit which has been polled to activate its associated tone caller.

4. A telecommunications system as claimed in claim 3, wherein each of said plurality of portable units and base stations comprises a radio receiver/transmitter controlled by a respective one of said plurality of system controllers, said system controllers being arranged to set up a radio frequency communication channel between the respective portable unit and a base station, and control the transfer of messages therebetween.

* * * * *